April 28, 1942.　　　A. BOYNTON　　　2,280,788
FLOW DEVICE FOR OIL WELLS
Filed Dec. 8, 1939　　　2 Sheets-Sheet 1

ALEXANDER BOYNTON, INVENTOR,
BY Jesse R. Stone
Lester B. Clark
ATTORNEYS.

April 28, 1942.    A. BOYNTON    2,280,788
FLOW DEVICE FOR OIL WELLS
Filed Dec. 8, 1939    2 Sheets-Sheet 2

ALEXANDER BOYNTON,
INVENTOR,
BY Jesse R. Stone
Lester B. Clark
ATTORNEYS.

Patented Apr. 28, 1942

2,280,788

UNITED STATES PATENT OFFICE 2,280,788

FLOW DEVICE FOR OIL WELLS

Alexander Boynton, San Antonio, Tex.

Application December 8, 1939, Serial No. 308,322

9 Claims. (Cl. 103—233)

My invention relates to flow devices for wells.

The principal object is to prevent slippage of the well liquid from causing the flow device valves to be forced open and waste gas while the well is flowing.

Another object is to provide that the area acted upon by the valve seating force will be greater than the area of the valve.

Another object is to increase the volume of educed liquid.

Another object is to minimize emulsification of the oil during the flowing operation.

A further object is to provide a flow device especially adapted to be employed in deep wells.

I attain the foregoing objects by means of similar devices adapted to be connected into the eduction tube at intervals which may vary between 150 to 300 feet. Each device has two valves adapted to close upon their respective seats responsive to different force values, the force required to seat one valve being relatively small; while the force required to seat the other valve is relatively great. Each valve is actuated by pressure fluid which enters the device from opposite directions or separate conduits and discharges into the eduction tube through a common opening, this common opening being closed by the valve requiring the greater force to seat it which causes the other valve to unseat then and to seat again soon after the high pressure valve unseats; all of which movements and the purposes thereby accomplished will be more completely set out and fully explained in the following specification and accompanying drawings, in which—

Similar reference characters are employed to designate similar parts throughout the several views of each embodiment.

The column of well liquid caused to upstand in the eduction tube in balance against the force of the pressure fluid will be referred to as the upstanding column.

The difference between the force of the pressure fluid employed to flow the well and the force exerted by the upstanding column will be referred to as the differential.

It will be understood that expulsion of well liquid is accomplished by aeration of the upstanding column and that the pressure fluid is a constant force at any given value thereof, while the force exerted by the upstanding column varies according to distance above the base of the upstanding column, the valves being open or closed according to the difference between the value of the pressure fluid and the force exerted by the upstanding column.

Figure 1:
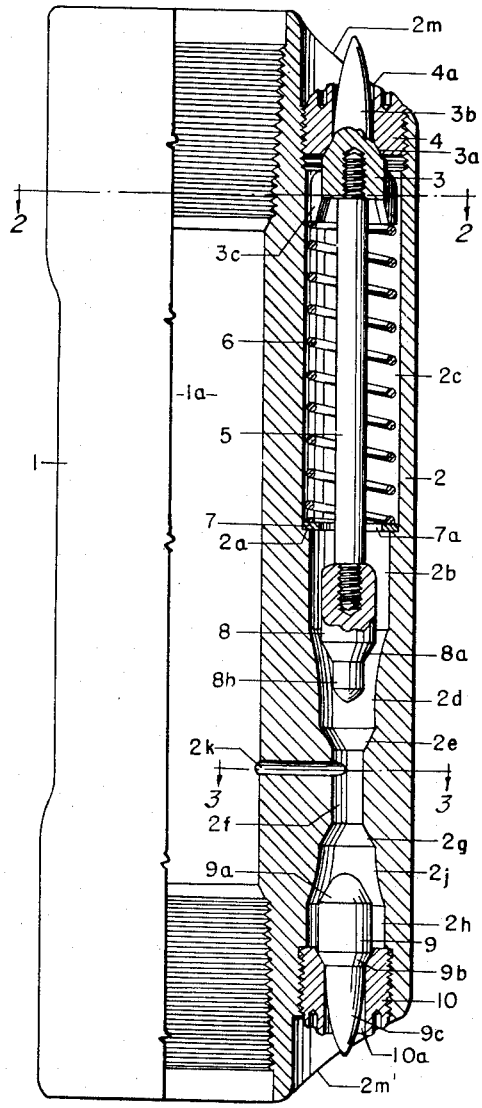
-Fig. 1 is a longitudinal section through the preferred embodiment, part of the nipple portion being shown in outside view.
Figure 2:
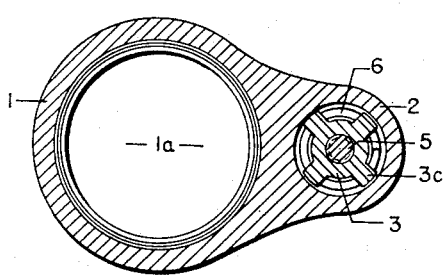
Fig. 2 is a cross section on the line 2—2, Fig. 1.
Figure 3:
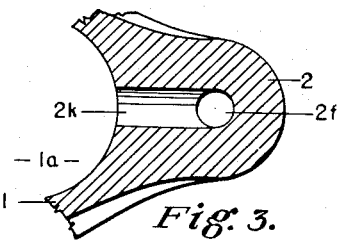
Fig. 3 is a cross section on the line 3—3, Fig. 1.

In Fig. 1 the coupling member 1, having the central passage 1a aligned with the opening through the tubing, is adapted to be threadedly joined into the tubing string. The lateral housing 2, which may be cast integrally with the member 1, has a central longitudinal bore formed into the spring chamber 2c, the upper plunger chamber 2b, the metering chamber 2d, the passage 2f, the metering chamber 2j, and the lower plunger chamber 2h. The sloping upper and lower ends 2m and 2m' of the housing serve as guides through the well casing.

The lower end of the chamber 2c forms the annular shoulder 2a. The lower end of the metering chamber 2d is formed into the valve seat 2e and the upper end of the metering chamber 2j is formed into the valve seat 2g.

The plug 4, having the central opening 4a has threaded connection into the upper end of the housing 2. The lower plug 10, having the central opening 10a, has threaded connection into the lower end of said housing.

The rod 5 has threaded connection with the intake member 3 and with the upper plunger 8. The coiled spring 6, having slight clearance within the chamber 2c, has its upper end engaged under the fins 3c of the valve head 3 and its lower end seated upon the ring 7 landed upon the annular shoulder 2a. The fins 3c have clearance within the bore 2c. The ring 7 has the large clearance 7a with the rod 5. The spring 6 normally causes the valve 3a of the head 3 to engage a seat upon the nether end of the plug 4.

The metering pin 3b extends upwardly from the valve and has its greatest diameter immediately above the valve 3a. It may be convexly tapered as appears. This pin, at the place of its greatest diameter, has slight clearance within the opening 4a.

The plunger 8 has the valve 8a adapted to engage the seat 2e and the depending extension 8b adapted to be slidable within the passage 2f.

The extension 8b will extend slightly below the lateral opening 2k and close it when the valve 8a is seated upon the seat 2e. The plunger 8 has its portion of greatest diameter extending slightly within the upper end of the convexly tapered metering chamber 2d. The plunger 8 has slight clearance within the lower end of the metering chamber 2d when the valve 8a is seated and increasing clearance as the valve unseats.

The lower plunger 9, having its upper end formed into the valve 9a adapted to engage the seat 2g, has the depending convexly tapered metering pin 9c normally extending into the central opening 10a. The plunger 9 has the valve 9b formed upon it adapted to engage normally upon a seat central within the upper end of the plug 10.

The upper end of the plunger 9 extends slightly within the lower end of the downwardly expanding convexly tapered metering chamber 2j when the plunger is in its lowermost position as appears in Fig. 1. This plunger has only slight clearance within the metering chamber 2j when the valve 9a is seated.

The spring 6 may be installed under such compression that the valve 3a will be unseated by the differential force required to seat the valve 9a upon its seat 2g. The force of the spring 6, for example, may be such that the valve 3a will unseat at 25 pounds differential and such that the valve 8a will seat at 100 pounds. The clearance around the plunger 9 and its metering pin 9c may be such that the valve 9a will seat at 25 pounds differential.

The path of pressure fluid into the upstanding column of well liquid within the eduction tube is (1) through the opening 10a, the chambers 2h and 2j, the passage 2f and the lateral opening 2k and (2) through the opening 4a, the chambers 2c, 2b, 2d, the passage 2f, and the lateral opening 2k.

It being assumed that the plungers 8 and 9 have equal clearance within their respective chambers, it is apparent that the unloaded valve 9a will seat before the spring loaded valve 8a will seat.

It is also apparent that as the valve 8a approaches its seat close enough for the extension 8b to close the opening 2k, while the valve 9a is seated, the pressure fluid draft past the plunger 9 will be interrupted and that the plunger 9 then will fall to the position shown in Fig. 1. The entire intake of pressure fluid being then around the plunger 8, it is apparent that the valve 8a will seat soon thereafter or as soon as the proper differential force develops during the well flowing operation.

While the valve 8a is seated, if falling slugs of well liquid within the eduction tube should produce momentary false low differentials, the valve 8a will be unseated, but as soon as this unseating movement progresses far enough to cause the extension 8b partially to uncover the lateral opening 2k, the valve 9a will again seat and thereby close the admission of pressure fluid into the tubing, except through the impaired clearance between the plunger 8 and the wall of the metering chamber 2d.

It will be noted that the clearance around the metering pin 3b within the opening 4a increases and that the clearance around the plunger 8 within the metering chamber 2d decreases as the valve 8a approaches its seat. Likewise, the clearance around the metering pin 9c within the opening 10a increases and the clearance around the plunger 9 within the metering chamber 2j decreases as the valve 9a approaches its seat. It therefore is apparent that the greatest volume of pressure fluid will pass both plungers when they are approximately half way of their travel toward their respective seats. This condition obviously may be varied by changing the tapers of the metering pins and metering chambers as different well conditions may require.

The smallest clearance around the plunger 8 being when the valve 8a is seated and this clearance ordinarily being very slight, such as two to ten thousandths of an inch, it follows that the volume of pressure fluid which will pass the plunger 8 will be slight until the valve 8a rises far enough from its seat to cause the plunger 9 to rise and close the valve 9a. This combination of valves, one opening when the other closes and one closing when the other opens, operates to admit the greatest volume of pressure fluid into the upstanding liquid column when the load is heaviest during low differentials and to restrict such flow of pressure fluid when the load lightens during higher differentials. At the same time, the lower valve 9 operates to check any excessive inflow of pressure fluid through the device during the existence of false low differentials.

Figure 4:
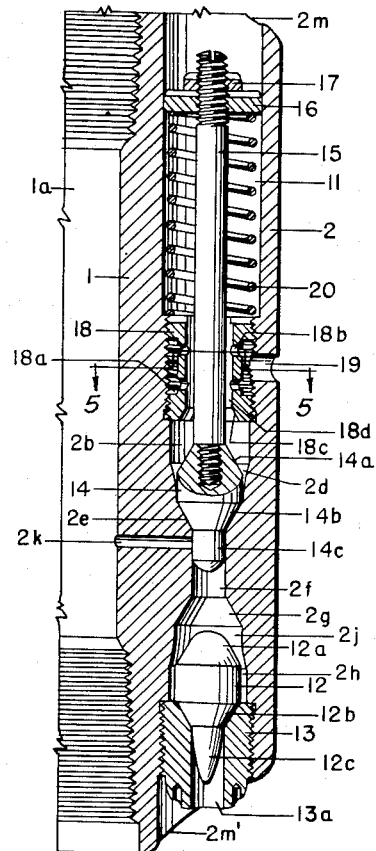
Fig. 4 is a partial longitudinal section through a modified form of the invention.
Figure 5:
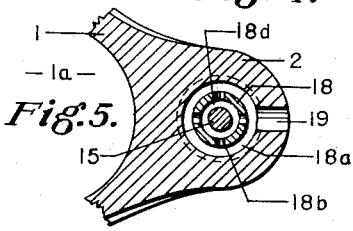
Fig. 5 is a cross section on the line 5—5, Fig. 4.

In Fig. 4, illustrating a modified construction, parts and portions of parts similar in both constructions are indicated by the same reference characters as in Fig. 1.

The lower plunger 12, having the valves 12a and 12b formed upon it and having a depending extension 12c formed into a metering pin normally extending to proximate the lower end of the opening 13a of the plug 13, serves the same purpose as was stated for the plunger 9 in Fig. 1 but some of the lengths and diameters are different to illustrate that different results may be accomplished by such changes. For example, the larger plunger 12 with less clearance around it than the plunger 9 has in Fig. 1, will cause its valve 12a to close at less differential than will be required to close the valve 9a, Fig. 1. The shorter metering pin 12c in Fig. 4 will allow the passing pressure fluid to increase in volume faster as the plunger 12 rises than the larger pin 9c in Fig. 1 would allow.

The valve 14b in Fig. 4 is shown seated as it would be during high differentials in the flowing operation. The valve 14a normally engages lightly upon the seat 18c upon the nether end of the baffle ring 18 by force of the spring 20 having some clearance with the chamber 11 and engaged between the member 18 and the nut 16 secured by the lock nut 17 upon the rod 15 having threaded engagement within the plunger 14. The valve 14a preferably will be adjusted by means of slight compression of the spring 20 to open at one to ten pounds differential.

The depending extension 14c of the plunger 14 is shown closing the lateral opening 2k in Fig. 4 similar to the operation of the extension 8b in Fig. 1 during high differentials. This closing of the opening 2k in Fig. 4 explains the lower position of the plunger 12 during the existence of a high differential necessary to seat the valve 14b.

The path of pressure fluid through this device is via the intake port 19, the annular space 18a, the openings 18b, the clearance 18d, the chambers 2b and 2d, the passage 2f and the lateral opening 2k. The fact that the nut 16 has very slight clearance within the chamber 11 forces the incoming pressure fluid to take the indicated path.

One of the important features of this invention is that the nut 16, having greatly larger area exposed to the differential force than that of the plunger 14, will actuate the plunger in its travel toward the seat 2e.

It will be observed that the metering pin 3b and the valve 3a in Fig. 1 are omitted from the construction in Fig. 4. The greatest volume of pressure fluid, therefore, will pass the upper plunger 14 during low differentials; while the lower plunger 12 will allow the greatest volume of pressure fluid to pass it when it is approximately half way of its travel toward the seat 2g. Otherwise than stated, the operation of the constructions illustrated in Figs. 1 and 4 are identical.

At conclusion of the flowing operation, the construction illustrated in Fig. 1 will prevent drainage of the flow tubing if a check valve be employed therein proximate its lower end because, at such times, the valves 3a and 9b will be closed as appears. Likewise, the construction illustrated in Fig. 4 will prevent the tubing from draining its contents back into the well at conclusion of the flowing operation because the valves 12b and 14a will be closed then.

Figures 6, 7, 8, 9:
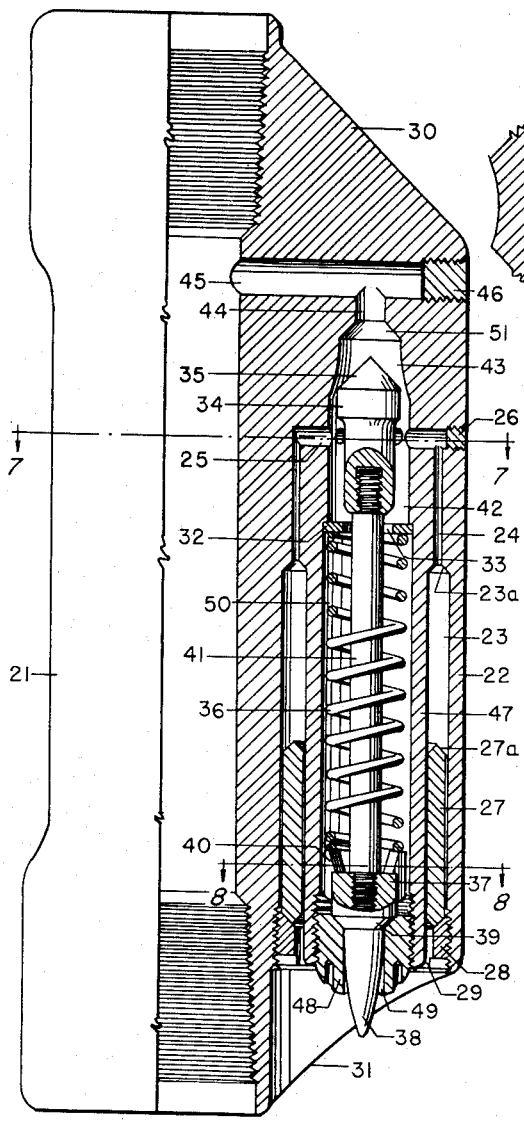
Fig. 6 is a partial longitudinal section through another modified form of the invention, a part of the nipple portion being in outside view.
Fig. 7 is a cross section on the line 7—7, Fig. 6.
Fig. 8 is a cross section on the line 8—8, Fig. 6.
Fig. 9 is a broken side view partly in central longitudinal section showing the devices in a well.

In Fig. 6, illustrating another modified construction, the coupling member 21 may be cast integrally with the lateral housing 22 having the upper sloping surface 30 and the lower sloping face 31 serving as guides through the well casing.

The upper end of the annular chamber 23 is formed into the valve seat 23a centrally of which seat the small annular chamber 24 extends upward to the cross bores 25 which communicate with the bore 42.

The annular plunger 27, having the valve 27a adapted to close upon the seat 23a, has slight internal clearance with the inner wall 47 of the chamber and slight external clearance with the outer wall 22. The plunger 27 is retained by the ring 28 having threaded engagement within the wall of the housing 22. The annular clearance 29 between the ring 28 and the shell 47 admits pressure fluid into the chamber 23.

The rod 41 has threaded engagement with the plunger 34 and with the valve member 37. The coiled spring 36 is engaged under some compression between the ring 32 and the fins 40 of the member 37 having the valve 39 engaged upon a seat formed upon the upper end of the plug 48 by force of the spring. The ring 32, having the large clearance 33 with the rod 41, may be landed upon a small annular shoulder at the upper end of the chamber 50, as appears.

The convexly tapered metering pin 38 has slight clearance within the opening 49 proximately below the valve 39 and larger clearance below, as appears.

The plunger 34 has its upper end formed into the valve 35 adapted to engage the seat 51 during which engagement there is only slight clearance between the plunger and the metering chamber 43, this clearance increasing with increasing distance from the seat.

The upper end of the plunger 34 normally is positioned slightly within the metering chamber 43.

The path of the pressure fluid into the eduction tube is (1) via the annular opening 29, the lower annular chamber 23, the upper annular chamber 24, the cross bores 25, the chambers 42 and 43, the opening 44 and the cross bore 45, (2) via the opening 49, the chamber 50, the chambers 42 and 43, the opening 44 and the cross bore 45.

It will be observed that both paths of the pressure fluid unit above the cross bores 25.

The annular plunger 27 should have such small clearance around it as to cause it to seat before the valve 35 will seat after which seating the valve 27a will unseat and resume the position shown in Fig. 6, because the seating of the valve 35 closes the path of pressure fluid through the chamber 23. This path will be, of course, re-opened when the valve 35 unseats, as was explained for the differently constructed but similarly operated valves in Figs. 1 and 4.

The spring 36 may be of such force that the valve 39 will not unseat until the valve 27a has seated. Such adjustment provides that relatively large volumes of pressure fluid will pass through the device at low differentials and that metering will begin only after the valve 39 is unseated. Manifestly the volume of admitted pressure fluid will be controlled then by the metering pin 38 and the metering chamber 43 similar to the manner explained in connection with Fig. 1. The plugs 26 are employed to close the outer extremities of the cross bores 25.

In Fig. 9, illustrating the devices installed in a well, the casing head 53 is employed to accomplish a hermetic seal between the casing 52 and the tubing 57. One side opening of the casing head is shown closed by the bull plug 55, and the other side opening has the pressure fluid supply line 56 connected into it.

It will be understood that the flow devices may be spaced in the tubing at such distances apart that the well liquid between adjacent devices will exert a pressure equal to approximately one third to one half the differential force required to close the spring-loaded valves.

The tubing 57, surrounded by the annular space 63, may have the perforations 59 proximate its lower end shown resting upon the bottom of the well 61. Well liquid from the producing formation 60 may enter the casing 52 via the gun perforations 62.

Well liquid is assumed to be standing in both the casing and tubing at the level 64 when pressure fluid is turned into the annular space 63 from the pipe line 56. The normal liquid level 64 then becomes depressed in the casing to the level 65 and is caused to upstand in the tubing to the level 66.

The device 58 next above the level 65 will be intaking pressure fluid due to the relatively low differential then obtaining there, while the device next above the open one will be closed or closing, due to the relatively great differential obtaining at that level.

As the liquid level 65 is lowered by flowing, the next lower valve will be uncovered in the open position, due to the slight differential then obtaining there, while the next upper valve will be closed, or closing, and so on until the well is pumped off or until the level is reached at which the rate of inflow and outflow will be equal.

Manifestly the invention as herein disclosed is subject to many minor changes and adaptations wherein mechanical equivalents may be substituted for the parts shown, and I reserve the right to make such changes, substitutions, and adaptations within the scope and purpose of the stated objects and appended claims.

What is claimed is:

1. A flow nipple, a lateral housing thereon, an upper valve chamber therein, a lower valve chamber in alignment with said upper chamber, a cylindrical passage connecting said chambers, a lateral outlet from said passage to the interior of said flow nipple, a valve in said upper chamber, a seat therefor at the upper end of said passage, means to hold said valve resiliently off its seat, a lower valve in said lower chamber, and an annular seat therefor in said lower chamber at the lower end of said passage, there being fluid passages communicating from the exterior into said upper chamber and said lower valve chamber respectively.

2. A flow nipple, a lateral housing thereon, an upper valve chamber therein, a lower valve chamber, a cylindrical passage connecting said chambers, a lateral outlet from said passage to the interior of said flow nipple, a valve in said upper chamber, a seat therefor at the upper end of said passage, means to hold said valve resiliently off its seat, a cylindrical extension on the lower side of said valve adapted to close said outlet as said valve approaches its seat, an arcuately tapered lower end on said upper chamber above said seat, a lower valve in said lower chamber, and a removable annular seat therefor in said lower chamber, there being fluid passages communicating from the exterior into said upper chamber and said lower valve chamber respectively.

3. A flow nipple, a lateral housing thereon, an upper valve chamber therein, a lower valve chamber in alignment with said upper chamber, there being an inlet for each of said chambers, a cylindrical passage connecting said chambers, a lateral outlet from said passage to the interior of said flow nipple, a valve in said upper chamber, a seat therefor at the upper end of said passage, means to hold said valve resiliently off its seat, valve seats at the upper and lower ends of said lower chamber, a valve member formed to fit said seats and movable from one seat to the other by differential fluid pressures in said lower chamber, said valve member being adapted to close to its lower seat when flow of fluid in said passage is cut off, and means on said upper valve to cut off said flow.

4. In a differential flow device, a nipple, a housing thereon, upper and lower valve chambers therein, a fluid passage connecting said chambers, there being a lateral opening from said passage to the interior of said nipple, a valve stem in said upper chamber, an upper valve on said stem, an inlet port having a seat to receive said valve, a lower valve on said stem, a seat therefor at the upper end of said passage, a cylindrical extension on said lower valve to fit within said passage and close said lateral opening as said lower valve approaches its seat, a spring positioned to hold said upper valve normally closed and said lower valve normally open, means to meter the passage of fluid past said valves to permit greatest volume of flow when said valves are in an intermediate position, an inlet to said lower chamber, upper and lower seats in said lower chamber and a valve movable between the seats of said lower chamber.

5. In a differential flow device, a nipple, a housing thereon, upper and lower valve chambers therein, a fluid passage connecting said chambers there being a lateral opening from said passage to the interior of said nipple, a valve stem in said upper chamber, an upper valve on said stem, an inlet port having a seat to receive said valve, a lower valve on said stem, a seat therefor at the upper end of said passage, a cylindrical extension on said lower valve to fit within said passage and close said lateral opening as said lower valve approaches its seat, a spring positioned to hold said upper valve normally closed and said lower valve normally open, an inlet to said lower chamber, upper and lower seats in said lower chamber, a check valve member movable between said seats, said check valve being adapted to close against its upper seat before said lower valve engages its seat, said check valve seating on its lower seat when said extension closes said lateral opening.

6. In a flow device for wells, a nipple, a housing thereon, upper and lower valve chambers in said housing, said chambers having inlets thereto, a passage connecting said chambers, a lateral port in said passage communicating with the interior of said nipple, arcuately tapered walls on said chambers adjacent said passage, valve seats in said chambers at the ends of said passage, a valve in said upper chamber formed to fit loosely in said tapered portion and to engage its seat, a cylindrical extension on said valve to extend into said passage and cut off flow of fluid to said lateral port as said valve approaches its seat and thereby prevent quick opening of said valve under false differentials, a spring positioned to hold said valve resiliently off its seat, and a check valve in said lower chamber adapted to close against the outward passage of fluid when an outward surge of fluid occurs under false differentials.

7. In a flow device for wells, a nipple, a housing thereon, upper and lower valve chambers in said housing, a passage connecting said chambers, a lateral port in said passage communicating with the interior of said nipple, arcuately tapered walls on said chambers adjacent said passage, valve seats in said chambers at the ends of said passage, a valve in said upper chamber formed to fit loosely in said tapered portion and to engage its seat, a cylindrical extension on said valve to extend into said passage and cut off flow of fluid to said lateral port as said valve approaches its seat and thereby prevent quick opening of said valve under false differentials, a spring positioned to hold said valve resiliently off its seat, inlet ports to said upper and lower chambers, a double ended valve in said lower chamber movable between its upper and lower seats, said double ended valve being moved by differential fluid pressures thereon to close on its upper seat before said first mentioned valve closes and to drop to its lower seat when flow of fluid to said nipple is closed off.

8. A flow device for wells including a flow nipple, a housing thereon, upper and lower valve chambers in said housing, there being an inlet for each of said chambers, a passage connecting said chambers, said passage having a lateral port into said nipple, valve seats in said chambers at the ends of said passage, conversely tapered walls in each of said chambers adjacent said seats, valves in said chambers adapted to engage said seats, said valves each having a cylindrical body cooperating with said tapered walls to meter the passage of fluid to said passage.

9. A flow device for wells including a flow nipple, a housing thereon, upper and lower valve chambers in said housing, there being an inlet for each of said valve chambers, a passage connecting said chambers, said passage having a lateral port into said nipple, valve seats in said chambers at the ends of said passage, conversely tapered walls in each of said chambers adjacent said seats, valves in said chambers adapted to engage said seats, said valves each having a cylindrical body cooperating with said tapered walls to meter the passage of fluid to said passage, a spring resiliently supporting the valve in said upper chamber, whereby the lower valve will seat before the upper one, and means to close off passage of fluid to said port as said upper valve approaches its seat.

ALEXANDER BOYNTON.